United States Patent
Clifford et al.

(10) Patent No.: US 9,465,840 B2
(45) Date of Patent: *Oct. 11, 2016

(54) DYNAMICALLY INDENTIFYING AND PREVENTING SKEWED PARTITIONS IN A SHARED-NOTHING DATABASE

(71) Applicant: International Business Machines Corporation, Armonk, NY (US)

(72) Inventors: Austin Clifford, Dublin (IE); Konrad Emanowicz, Dublin (IE); Enda McCallig, Robertstown (IE)

(73) Assignee: International Business Machines Corporation, Armonk, NY (US)

( * ) Notice: Subject to any disclaimer, the term of this patent is extended or adjusted under 35 U.S.C. 154(b) by 288 days.

This patent is subject to a terminal disclaimer.

(21) Appl. No.: 14/210,505

(22) Filed: Mar. 14, 2014

(65) Prior Publication Data

US 2015/0261816 A1   Sep. 17, 2015

(51) Int. Cl.
  *G06F 17/30*   (2006.01)
(52) U.S. Cl.
  CPC ... *G06F 17/30454* (2013.01); *G06F 17/30339* (2013.01); *G06F 17/30445* (2013.01); *G06F 17/30584* (2013.01); *G06F 17/30864* (2013.01)
(58) Field of Classification Search
  CPC .................. G06F 17/30454; G06F 17/30339; G06F 17/30445; G06F 17/30584
  See application file for complete search history.

(56) References Cited

U.S. PATENT DOCUMENTS

| | | | |
|---|---|---|---|
| 7,146,365 B2 * | 12/2006 | Allen ................ | G06F 17/30336 |
| 8,078,610 B2 | 12/2011 | Molini | |
| 8,131,711 B2 | 3/2012 | Xu et al. | |
| 8,190,598 B2 | 5/2012 | Al-Omari et al. | |
| 8,195,644 B2 | 6/2012 | Xu | |
| 8,234,268 B2 | 7/2012 | Xu et al. | |
| 2004/0225673 A1 * | 11/2004 | Beck ................. | G06F 17/30598 |
| 2007/0299810 A1 * | 12/2007 | Riedel ............... | G06F 17/30306 |
| 2008/0092142 A1 * | 4/2008 | Tran ..................... | G06F 9/5083 718/105 |
| 2009/0024568 A1 * | 1/2009 | Al-Omari ......... | G06F 17/30498 |
| 2011/0093499 A1 | 4/2011 | Zhou et al. | |
| 2011/0289112 A1 * | 11/2011 | Kamimura ........ | G06F 17/30377 707/769 |

(Continued)

OTHER PUBLICATIONS

Abdelsalam Helal et al., Dynamic Data Reallocation for Skew Management in Shared-Nothing Parallel Databases, Mar. 17, 1997, Springer Link, vol. 5, pp. 271-288.*
U.S. Appl. No. 14/535,566, entitled: "Dynamically Identifying and Preventing Skewed Partitions in a Shared-Nothing Database", filed on Nov. 7, 2014.

(Continued)

*Primary Examiner* — Sherief Badawi
*Assistant Examiner* — Lahcen Ennaji
(74) *Attorney, Agent, or Firm* — Teddi E. Maranzano; Steven Kurlowecz (57) ABSTRACT

Dynamically identifying and preventing skewed partitions in a shared-nothing database is provided. The database management system software receives a parameter for identifying a threshold value associated with at least one distribution key value. Optimizer statistics are gathered on a first table that is distributed across one or more partitions in the shared-nothing database, wherein the first table includes a first table name. Distribution key skew is identified based on the gathered optimizer statistics indicating the threshold value being exceeded. A second table with an alternate distribution key, is created having a second table name for receiving overflow data rows associated with the at least one distribution key value based on the identified distribution key skew. A union all view is created based on the first and the second table.

12 Claims, 6 Drawing Sheets

(56) References Cited

U.S. PATENT DOCUMENTS

2012/0310986 A1* 12/2012 Frantz ............... G06F 17/30306
                                                          707/792
2013/0080473 A1*  3/2013 Kuno ................ G06F 17/30584
                                                          707/797
2013/0124501 A1   5/2013 Xu
2014/0108459 A1*  4/2014 Gaza ................ G06F 17/30289
                                                          707/792

OTHER PUBLICATIONS

Pavlo et al., "Skew-Aware Automatic Database Partitioning in Shared-Nothing, Parallel OLTP Systems", SIGMOD'12, May 20-24, 2012, Scottsdale, Arizona, USA, pp. 61-72.
Xu et al., "Sampling-Based Partitioning in MapReduce for Skewed Data", 2012 Seventh ChinaGrid Annual Conference, 2012 IEEE, pp. 1-8.

* cited by examiner

DYNAMICALLY IDENTIFYING AND PREVENTING SKEWED PARTITIONS IN A SHARED-NOTHING DATABASE

FIELD

The present disclosure relates generally to the field of database systems, and more particularly, to dynamically identifying and preventing skewed partitions in a shared-nothing database.

BACKGROUND

In a shared-nothing partitioned database architecture, table data can be spread across multiple database partitions existing on multiple server machines for flexible workload parallelization. A distribution key is used to distribute table and index data across a set of database partitions. The distribution key for a table in a table space on a partitioned database partition group is specified in the CREATE TABLE statement or the ALTER TABLE statement, and comprises one or more columns. To determine placement of rows in a database partition, a hashing algorithm is applied to all of the columns of the distribution key. This results in the generation of a distribution map index value. The database partition number at that index value in the distribution map identifies the database partition in which the row is to be stored.

Provided that the number of rows for each distribution key value is fairly consistent, the hashing algorithm will result in an even distribution of data rows across the database partitions. However in practice, a distribution key may skew toward a particular distribution key value. In a customer sales tracking database this may occur, for example, when a specific customer, represented by a single customer number, generates an unexpectedly large number of sales. As a result, the index map entry generated by the hashing algorithm for that customer number may resolve to a single database partition for inserting the sales rows, and this effectively prevents query parallelization and results in poor performance. Since it is not possible to alter the distribution key for a table without dropping and recreating the table, performance may be improved if rows associated with a skewed distribution key could be dynamically re-assigned to other database partitions to balance the distribution of data rows.

BRIEF SUMMARY

Among other things, a method for dynamically identifying and preventing skewed partitions in a shared-nothing database is provided. According to an embodiment of the invention, dynamically identifying and preventing skewed partitions in a shared-nothing database is provided, comprising: receiving a parameter for identifying a threshold value associated with at least one distribution key value; gathering optimizer statistics on an original table distributed across one or more partitions in the shared-nothing database, wherein the original table includes an original table name; identifying distribution key skew based on the gathered optimizer statistics indicating the threshold value being exceeded; creating an overflow table, with an alternate distribution key, having an overflow table name for receiving overflow data rows associated with the at least one distribution key value based on the identified distribution key skew; and creating a union all view based on the original table and the overflow table.

In a shared nothing database, data is divided into partitions (also known as shards) and placed over one or more nodes or individual machines which have local disk storage, memory and central processing unit (CPU). Over the course of time, a successful shared-nothing partitioned database will require expansion through the addition of new nodes to accommodate further data growth while maintaining performance. To maintain a balanced allocation of data for each table across the expanded system, and to allow for future growth on the existing partitions, the data must be redistributed across the system. This process can take a significant amount of time, since it may require relocating hundreds of terabytes of data. Additionally, the need for redistribution is often recognized re-actively at query time, after the imbalance in data has already occurred. Typically, the process of redistributing partitioned data is performed as an offline activity and requires several days outage. Other approaches to maintaining balanced distribution of the partitioned data have either required multiple copies of the data to be maintained during the redistribution process, or may not have preserved the collocation between tables during the redistribution. Embodiments of the present disclosure proactively recognize an outlier distribution key value, thereby recognizing the need for rebalancing partitioned data prior to query performance becoming degraded. The rows for the outlier distribution key are dynamically reassigned to an overflow table with an alternate distribution key, thereby maintaining system availability. In addition, client applications accessing the partitioned data are able to continue uninterrupted processing without modifying their queries, since the exiting and overflow tables are transparently presented as a unified table to the user.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Embodiments of the present invention will now be described with reference to the figures. FIGS. 1-5, depict an exemplary implementation for dynamically identifying and preventing skewed partitions in a shared-nothing database. In a shared nothing database, data is divided into partitions (also known as shards) and placed over one or more nodes or individual machines which have local disk storage, memory and central processing unit (CPU). The partitions, nodes and machines are connected to each other through a high speed interconnect through which all database inter-partition communication is facilitated. Each partition has no direct access to data on other partitions and nodes, other than through the high speed interconnect.

Figure 1:
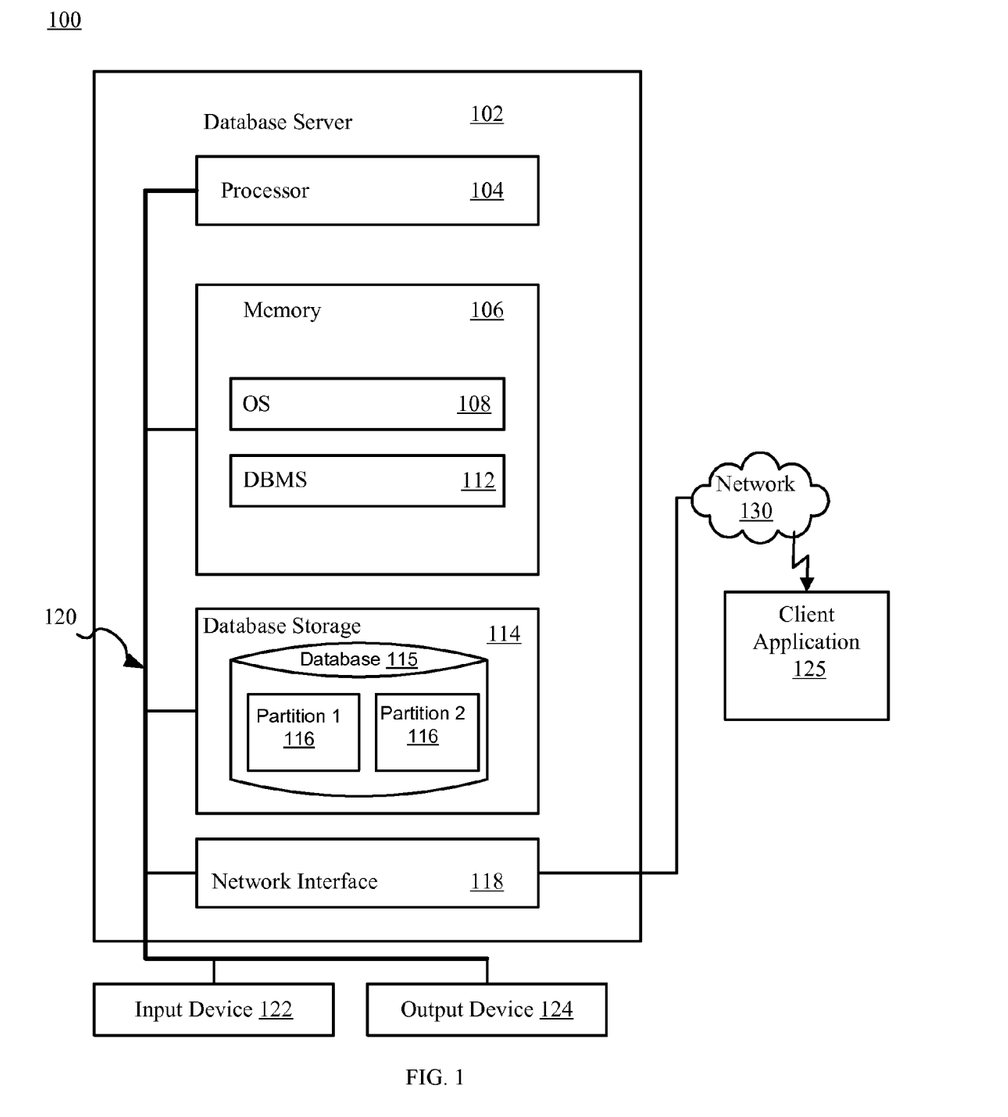
FIG. 1 depicts an example of a system environment, according to an embodiment of the present disclosure.

FIG. 1 depicts an exemplary embodiment of a system 100 for dynamically identifying and preventing skewed partitions in a shared-nothing database. The networked system 100 includes a database server 102. The database server 102 may also be connected to other computers and servers via a network 130. The network 130 may include connections, such as wire, wireless communication links, or fiber optic cables.

The database server 102 generally includes a processor 104 connected via a bus 120 to a memory 106, a network interface device 118, a storage 114, an input device 122, and an output device 124. The database server 102 is generally under the control of an operating system 108, such as for example Linux. However, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger formats. The network interface device 118 may be any type of network communications device allowing the database server 102 to communicate with other computers via the network 130.

The database storage 114 may be a combination of fixed persistent optical and/or solid state storage devices. The memory 106 and the database storage 114 may be part of one virtual address space spanning multiple primary and secondary storage devices.

The input device 122 may be any device for providing input to the database server 102. For example, a keyboard and/or a mouse may be used. The output device 124 may be any device for providing output to a user of the database server 102. For example, the output device 116 may be any conventional display screen or set of speakers. Although shown separately from the input device 122, the output device 124 and input device 122 may be combined, as in a display screen with an integrated touch-screen.

As shown, the memory 106 of the database server 102 includes one or more software modules comprising the database management system (DBMS) 112 and configured to manage one or more databases 115, contained in the database storage 114 of the database server 102. Although one database 115 is shown for illustration purposes, multiple databases 115 may be managed by the DBMS 112. One skilled in the art of database management may appreciate that the DBMS 112 modules, while referred to generically, may include specialized modules that perform such tasks as processing Structured Query Language (SQL) queries, managing database transaction logs, and gathering statistics for optimizing SQL queries. Each database 115 may store control structures for the DBMS 112, such as system catalog tables, in addition to application data. The database 115 may be implemented as multiple partitions 116, and may reside on multiple database servers 102. Additionally, partitions 116 may be organized into partition groups (not shown) consisting of one or more partitions 116 each.

The client application 125 may be configured as a separate workstation or other computer that is remote from the database server 102. In this context, remote refers to a client using a network connection, such as the network 130, to communicate with the database server 102.

The particular description in FIG. 1 is for illustrative purposes only; it should be understood that the invention is not limited to specific described embodiments, and any combination is contemplated to implement and practice the invention.

Figure 2:
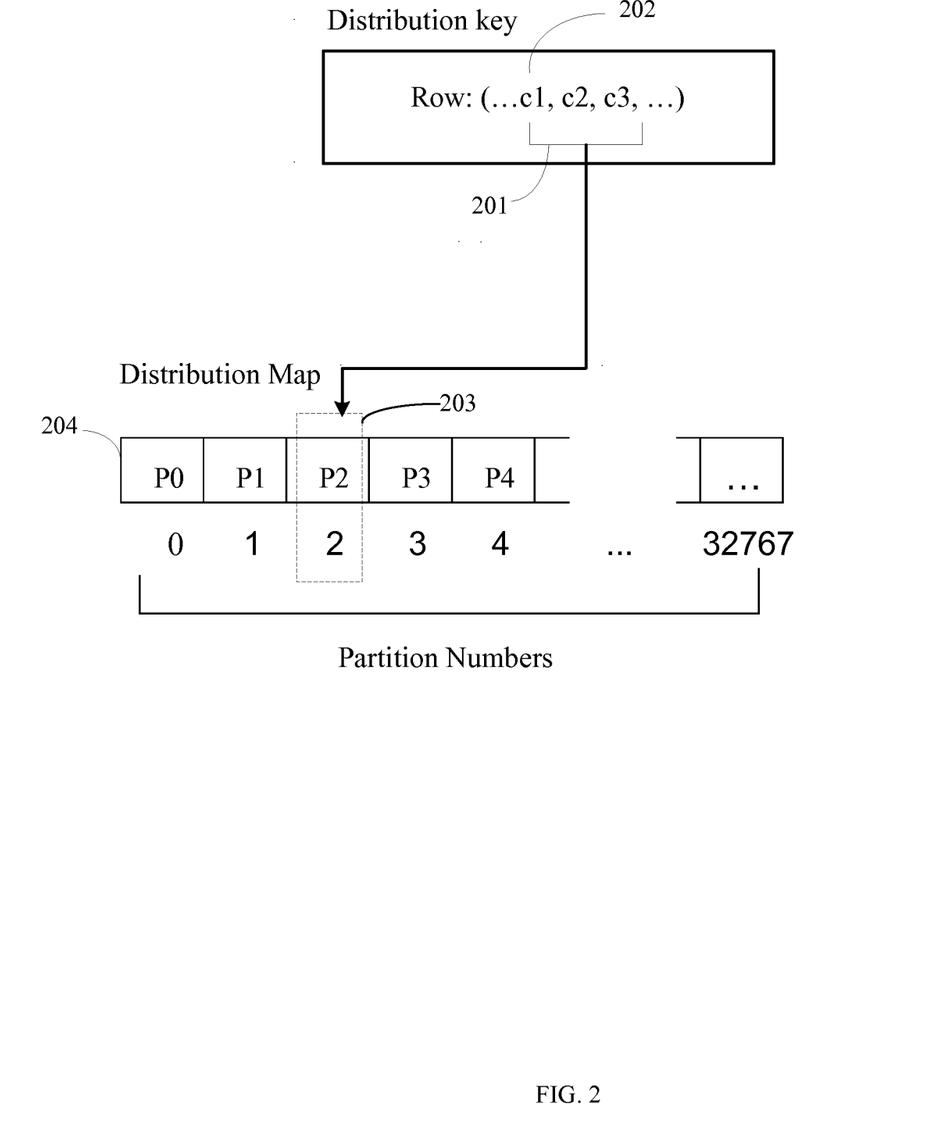
FIG. 2 depicts an example of a distribution map and key of an existing shared-nothing database.
Figure 3:
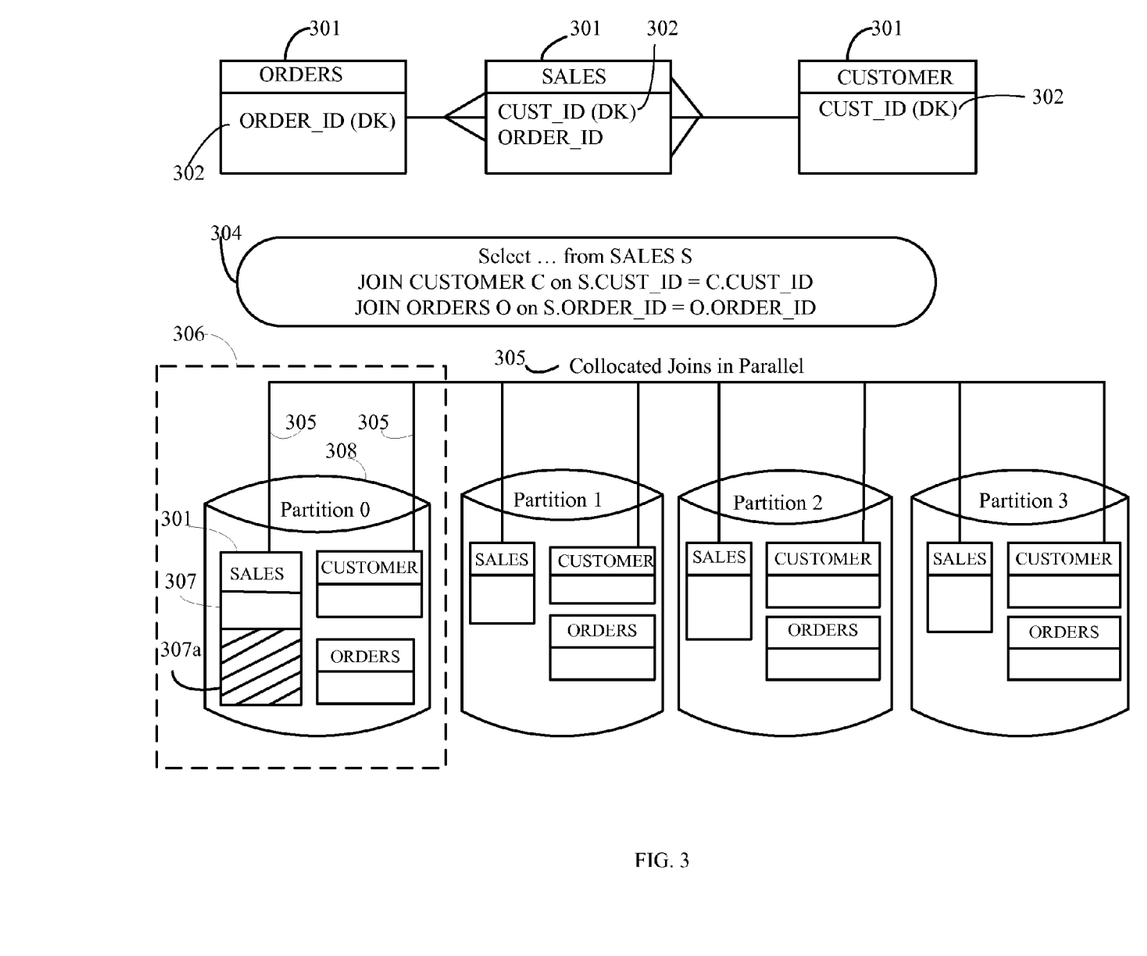
FIG. 3 depicts an example of collocated tables in a partitioned database environment.

FIG. 2 depicts an exemplary distribution map 204 and distribution key 201. In this example, a hashing algorithm is used for evenly distributing data among the partitions. Similarly sized partitions with data evenly distributed among them results in enhanced query performance by virtue that the query completes on each partition in approximately the same duration, i.e. without a straggler partition which has a greater amount of data due to a skew. As described in detail in FIG. 3 below, the query result cannot be returned to the end-user until the join query 305 (FIG. 3) has completed on all partitions 308 (FIG. 3). Therefore, if a partition 308 (FIG. 3) contains more data due to a skew in distribution key value, the local join on this partition, for example partition "0" of FIG. 3, may require more time and resources to complete, such as CPU, memory, and Input/Output access. In a partitioned database environment, the DBMS 112 (FIG. 1) uses the distribution map 204 to locate data, for example, to respond to end-user SQL queries. The distribution map 204 is an internally generated array, comprising a varying number of entries, depending on the number of partitions in the database. The distribution key 201 may be defined over one or more columns 202, such as c1, c2, and c3, within the row of table data. The placement of a row of data in a partition is determined by applying a hashing algorithm to the columns 202 of the distribution key 201, resulting in a distribution map 204 index value. The database partition number at that index value in the distribution map 204 identifies the database partition in which to store the row. For example, as depicted in 203, if applying the hash algorithm to the distribution key 201 results in a value of "2", then that value is used as an index into the distribution map 204 to select partition P2 to store the data row.

FIG. 3 depicts an exemplary shared-nothing database containing three tables 301: ORDERS, SALES, and CUSTOMER. As shown, portions of each table 301 are distributed among four partitions 308. In a partitioned architecture, a database partition 308 contains its own data, indexes, configuration files, and transaction logs. One skilled in the art of database architecture may appreciate that the database partitions 308 may be defined across one or more computers. Alternatively, all the database partitions 308 of the database may be defined to the same computer.

As depicted, block 306 shows a database partition 308, and portions of three tables 301: ORDERS, SALES, and CUSTOMER. For example, in the partition 308 the distribution key 302, CUST_ID, may range in value from "1" to "1999" in the SALES table 301. Together the areas 307 and 307a illustrate the total number of occurrences of data rows represented by the distribution key 302, CUST_ID within the partition 308. In the example, the area 307a illustrates a statistical outlier: the case where the customer with a CUST_ID, such as "1500", has generated an unexpectedly disproportionate number of sales, resulting in a skewed number of entries for this customer's CUST_ID within partition "0".

The DBMS recognizes when a collocated join, such as the join 305 between SALES and CUSTOMER shown in block 306, may be possible.

In a data warehouse, the database design typically collocates a fact table and its largest dimension table. For example, FIG. 3 depicts a simple star schema comprising a single fact and two dimension tables. In this example, the CUSTOMER (dimension) and SALES (fact) tables are both distributed on the CUST_ID column. A join operation across these two tables is processed locally on each partition of the containing partition group. When the tables involved in a join operation are collocated, as the CUSTOMER and SALES tables are in this example, the performance of the join operation is measurably and significantly improved as compared to that of a non-collocated join operation. One reason for this performance advantage is that a collocated join operation avoids having to send data being joined across the network to another server or partition where the join can be performed. Lines 305 indicate the parallel join activity occurring across each partition where the CUSTOMER and SALES tables are distributed. 304 shows a sample query for this join operation.

However, data skewed for a distribution key within a single partition, as in the example shown in block 306, reduces query performance by preventing optimal query parallelization. In practice, re-balancing the distribution of the data rows impacts database availability, since remediation requires dropping and recreating the affected tables and wholesale movement of data from the old to the new tables.

Figure 4:
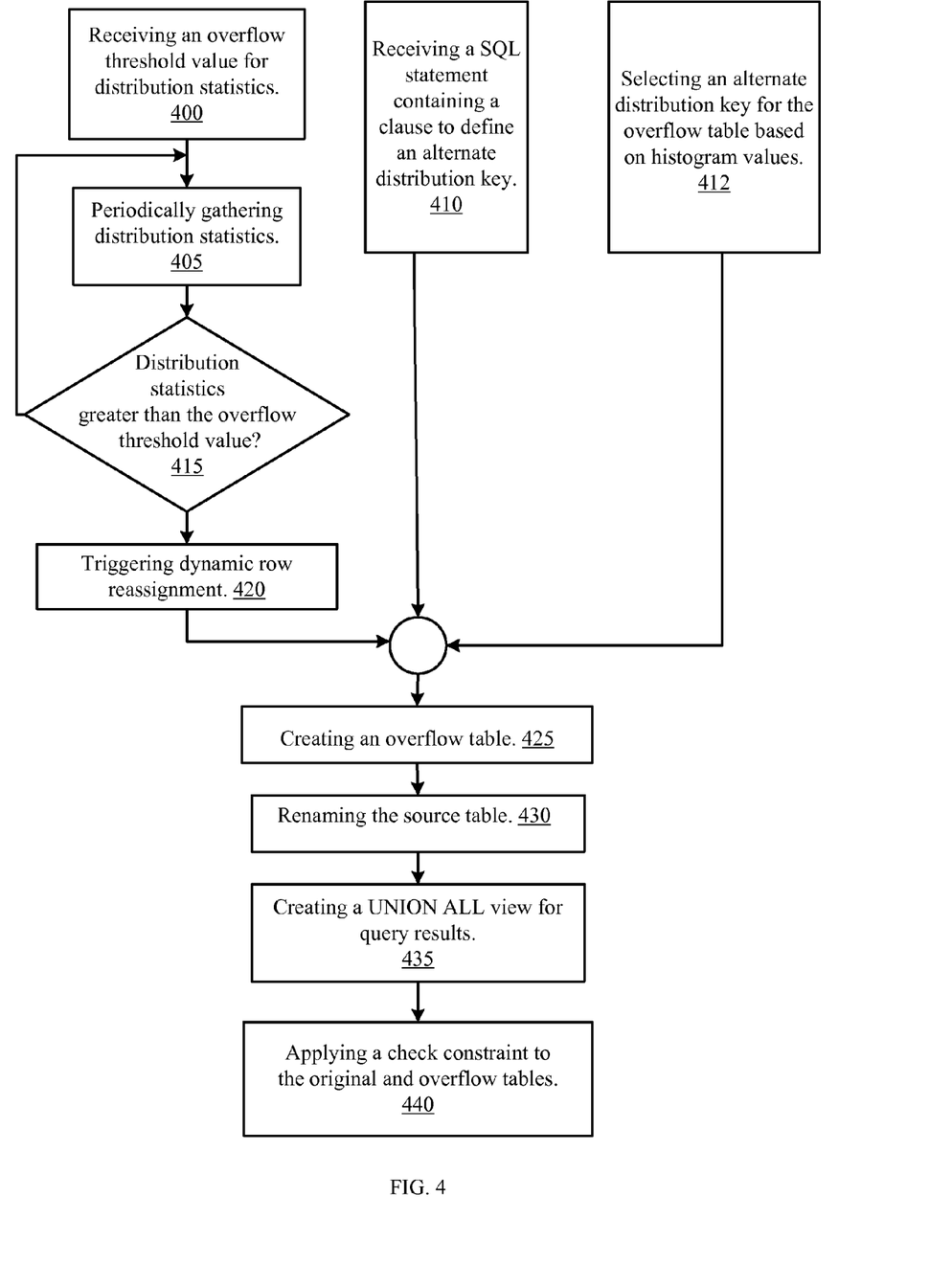
FIG. 4 depicts an exemplary embodiment of a method for dynamically identifying and preventing skewed partitions in a shared-nothing database environment.

Referring now to FIG. 4, an embodiment of a method for dynamically identifying and preventing skewed partitions in a shared-nothing database environment is depicted. In practice, a DBMS 112 (FIG. 1) may consist of one or more software modules that provide specialized functions, such as transaction log management, and memory management. Another specialized software module in the DBMS 112 (FIG. 1), for example an autonomic computing daemon (ACD), may manage administrative task scheduling, and gathering column distribution statistics for optimizing query plans. The gathered optimizer statistics may optionally include frequently occurring values in a column distribution key 302 (FIG. 3) (i.e., freqvalue) that may identify distribution key skew outliers. In the example of block 306 (FIG. 3), the area 307a illustrates a distribution key outlier: the case where the customer with a CUST_ID, such as "1500", is disproportionately represented within partition "0". In an embodiment, a facility is provided for dynamically setting an overflow threshold for a maximum skew in distribution key values. At 400, a configuration parameter, for example OVERFLOW_FREQVAL_PERC, may set an overflow threshold for a maximum freqvalue percentage of a table. For example, at database startup time the system administrator may define an OVERFLOW_FREQVAL_PERC of ten percent of the total rows (i.e., cardinality) in the table. Alternatively, the overflow threshold may be altered dynamically while the database is operational, thereby enhancing database serviceability and availability.

At 405, the ACD may, at a customizable configurable interval, gather column distribution statistics (i.e., optimizer statistics) automatically for a distribution key column. To ensure that skew is accurately identified, optimizer statistics are gathered on all database partitions for the distribution key defined with an OVERFLOW_FREQVAL_PERC.

If, at 415, the distribution statistics for the distribution key does not exceed the configured threshold value, for example ten percent, of the table cardinality, the ACD may continue to gather distribution statistics and test the gathered values against the configured threshold value. However, if the gathered distribution statistics do exceed the configured threshold value, then a dynamic row reassignment may be triggered for that distribution key at 420. In another embodiment, the ACD may send an alert to a designated administrator or end-user that the configured threshold value is reached, thereby allowing the administrator to choose how to remediate the distributed key value skew.

In another embodiment, 410, an optional clause to the CREATE TABLE data definition SQL statement is provided for defining an alternate distribution key, with a syntax similar to the following:

ALTERNATE DISTRIBUTE BY HASH (col1, coln) OVERFLOW_FREQVAL_PERC n where "col1, coln" are the alternate distribution key columns, and "n" represents the overflow threshold value. In another embodiment, the ALTER TABLE SQL statement may be modified to provide syntax similar to the ALTERNATE DISTRIBUTE BY HASH option.

Figure 3A:
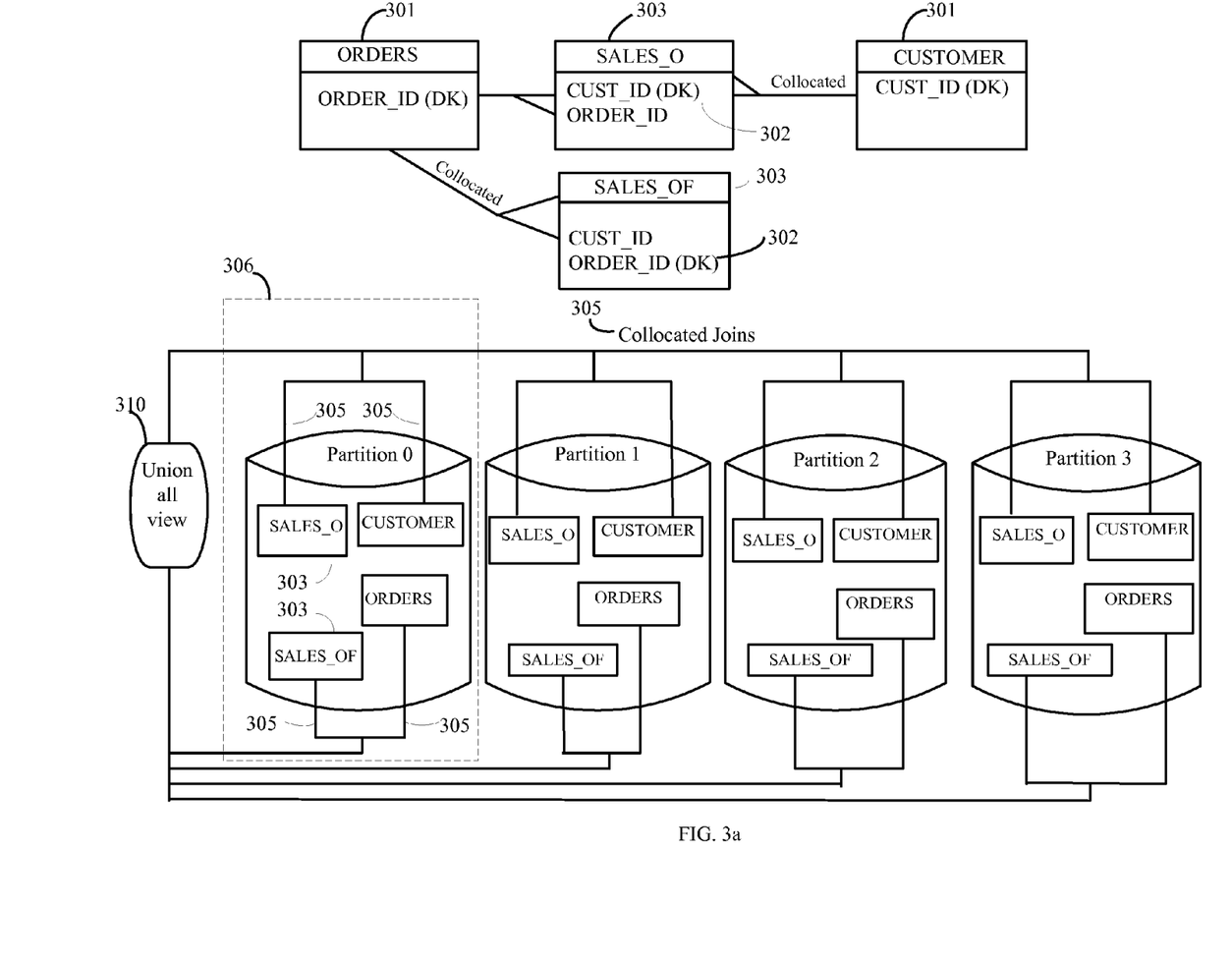
FIG. 3a depicts the collocated tables of FIG. 3 according to an embodiment.

In another embodiment, at 412 the ACD may automatically select an alternate distribution key for the overflow table, based on a statistically sampled histogram of values in the distribution key. By default, an optimizer may assume a uniform distribution of rows across the distinct values in a distribution key 302 (FIGS. 3 and 3a). However, if the data distribution for the distribution key 302 is not uniform, a data skew is recognized. In order to accurately reflect the non-uniform data distribution, the optimizer generates a histogram, thereby allowing a more accurate query execution plan to be created, and enabling the ACD to identify an alternate distribution key candidate.

At 425, an overflow table is created as a background process, using the alternate distribution key columns specified, and assigning an overflow threshold value of "n" percent. The name of the overflow table may be the original table name with the suffix of "_of" (overflow). To ensure the resulting overflow table name is unique, it is further identified by a system generated unique identifier. The original table is renamed at 430, in this example by adding an "_o" (original) suffix and a unique system generated identifier. For example, in block 306 of FIG. 3a the original SALES table becomes the SALES_O table 302, and an overflow table SALES_OF 303 is created. The tables in this example retain the root identifier of "SALES" which aids an administrator in identifying and managing them. However, in an embodiment, any name may be used. Neither the original nor the overflow table will have access permissions assigned directly at this point.

A UNION ALL view 310 (FIG. 3a), 435, is created to transparently present the data in the existing original and overflow tables as a single entity to the end-user. This a special form of view which allows data from multiple tables to be presented to the end-user as if the data resided in a single table. The UNION ALL view 310 (FIG. 3a) is not a physical materialization of the data; rather it is a mechanism for routing a query over the view to the two or more underlying tables. The UNION ALL view 310 (FIG. 3a) is created using the name of the original table, for example SALES, and is granted access permissions consistent with those on the original table. Naming the view using the name of the original table enables the end-user's SQL queries to execute without modification.

At 440, a check constraint on the distribution key column is applied to the original and overflow tables. Initially, the check constraint enforces that all rows are located in the original table. The ACD adds an additional implicitly hidden overflow indicator column named, for example, overflow, to both the original and overflow tables. The overflow indicator column is a nullable column, with an initial default value of "N" on the original table and "NULL" on the overflow table. These values indicate that data rows already in the original table, including those for the identified outlier distribution key value, should stay, but new data rows for the outlier should be placed in the overflow table. No structural change or data update is actually made to the tables for a nullable column. It is therefore an instantaneous operation with no requirement for additional storage. The DBMS simply returns the default value (or NULL if not set) when this overflow column is queried during UNION ALL processing.

FIG. 3a depicts the results after applying the ALTERNATE DISTRIBUTE BY HASH clause to the database architecture of FIG. 3. In this example, the ACD has identified that the distribution key for the CUSTOMER table, CUST_ID, has a skewed outlier value of "1500" since it accounts for more than the defined OVERFLOW_FREQVAL_PERC of ten percent of the table's rows. The original SALES table is renamed to SALES_O 303, and the new overflow table, SALES_OF 303 is created. The check constraint on the SALES_OF 303 table is set to "CUST_ID IN (1500)" and the check constraint on the SALES_O 303 table is set to "CUST_ID NOT IN 1500 OR OVERFLOW=N". The overflow indicator column allows the data rows that exist in the original table for the outlier distribution key value to continue to exist after this value violates the OVERFLOW_FREQVAL_PERC threshold. As a result, new rows inserted for the outlier distribution key, CUST_ID, are automatically diverted to the new table, SALES_OF 303, since no value is supplied for the implicitly hidden overflow indicator column. Compared to the original skewed distribution in FIG. 3, the fact rows for CUST_ID 1500 are now distributed evenly across all partitions, courtesy of the alternate distribution key used for the overflow table.

When the end-user runs a query which joins the SALES fact table to the CUSTOMER and ORDERS dimension tables, such as the query 304 (FIG. 3), the optimizer exploits the information from the check constraints over the distribution key on the UNION ALL view 310. The ACD creates the UNION ALL view 310 when a skew is detected, rather than at query time. However, at query time, the database optimizer can exploit the check constraints to rewrite the query over the UNION ALL view 310 as the union of two queries over the original and overflow tables, as shown, for example, in the union of the collocated join 305 between SALES_OF 303 and ORDERS 301, and the collocated join 305 between SALES_O 303 and CUSTOMER 301. This results in a balanced query distribution for both the skewed (overflow) and non-skewed (original) customer data, thereby maintaining good query performance and balanced system utilization across the shared-nothing cluster.

Figure 5:
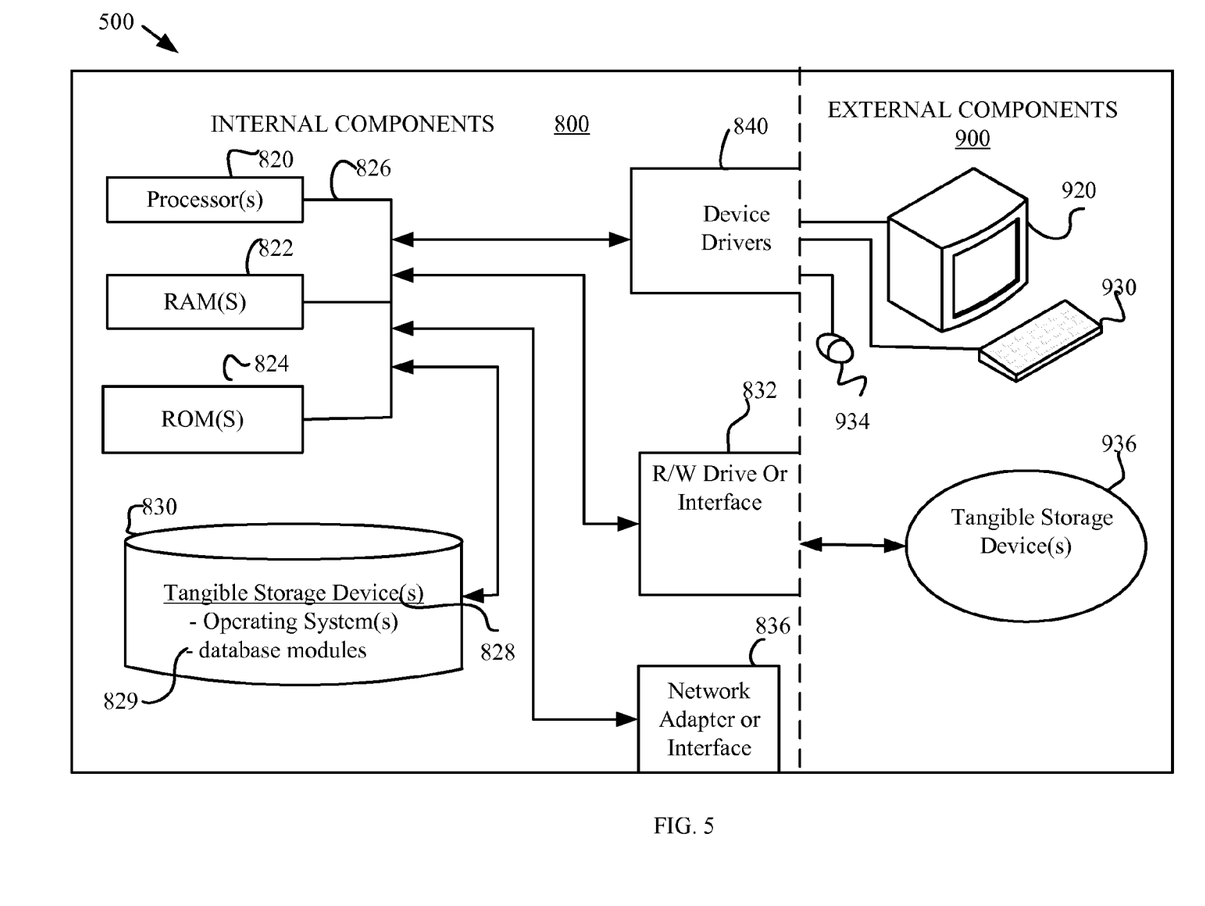
FIG. 5 is a schematic block diagram of hardware and software of the computer environment according to an embodiment of the method of FIG. 4.

Referring now to FIG. 5, computing device 500 may include respective sets of internal components 800 and external components 900 that together may provide an environment for a software application, such as a database management system (DBMS). Each of the sets of internal components 800 includes one or more processors 820; one or more computer-readable RAMs 822; one or more computer-readable ROMs 824 on one or more buses 826; one or more operating systems 828; one or more software applications (e.g., DBMS modules 829) executing the method 200; and one or more computer-readable tangible storage devices 830. The one or more operating systems 828 and DBMS modules 829 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The DBMS modules 829, and operating system 828 that are associated with computing device 500, can be downloaded to computing device 500 from an external computer (e.g., server) via a network (for example, the Internet, a local area network, or other wide area network) and respective network adapters or interfaces 836. From the network adapters (or switch port adapters) or interfaces 836 and operating system 828 associated with computing device 500 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A computer program product for dynamically identifying and preventing skewed partitions in a shared-nothing database comprising:
   a computer readable storage medium readable by a processing circuit and storing instructions for execution by the processing circuit for performing a method comprising:
   receiving a parameter for identifying a threshold value associated with at least one distribution key value;
   gathering optimizer statistics on an original table distributed across one or more partitions in the shared-nothing database, wherein the original table includes an original table name;
   identifying distribution key skew based on the gathered optimizer statistics indicating the threshold value being exceeded;
   creating an overflow table for receiving overflow data rows associated with the at least one distribution key value based on the identified distribution key skew, the created overflow table having an alternate distribution key and an overflow table name;
   creating a union all view based on the original table and the overflow table, wherein the creating of the union all view comprises:
      renaming the original to an other table name;
      assigning the original table name to the union all view; and
      applying a check constraint to the distribution key column and the overflow indicator column in the original table and in the overflow table.

2. The computer program product of claim 1, wherein an overflow indicator column is added to the original table and to the overflow table for diverting new data rows to the overflow table for the at least one distribution key value based on the identified distribution key skew.

3. The computer program product of claim 1, wherein the parameter for identifying the threshold value is at least one of:
   a configuration parameter input to a database management system at database start up time;
   a configuration parameter dynamically input to the database management system during database operation;
   an option to a Structured Query Language (SQL) statement to create a new table; and
   an option to a SQL statement to alter an existing table.

4. The computer program product of claim 1, wherein the alternate distribution key for the overflow table is input as an option on an SQL statement.

5. The computer program product of claim 1, wherein the database management system sends an alert to an end-user based on the threshold value being exceeded.

6. The computer program product of claim 1, wherein the database management system automatically selects an alternate distribution key for the overflow table, based on the gathered optimizer statistics.

7. A computer system for dynamically identifying and preventing skewed partitions in a shared-nothing database comprising one or more processors, one or more computer-readable storage devices, and a plurality of program instructions stored on at least one of the one or more storage devices for execution by at least one of the one or more processors, the plurality of program instructions comprising:
   a computer readable storage medium readable by a processing circuit and storing instructions for execution by the processing circuit for performing a method comprising:
   receiving a parameter for identifying a threshold value associated with at least one distribution key value;
   gathering optimizer statistics on an original table distributed across one or more partitions in the shared-nothing database, wherein the original table includes an original table name;
   identifying distribution key skew based on the gathered optimizer statistics indicating the threshold value being exceeded;
   creating an overflow table for receiving overflow data rows associated with at least one distribution key value based on the identified distribution key skew, the created overflow table having an alternate distribution key and an overflow table name;
   creating a union all view based on the original table and the overflow table, wherein the creating of the union all view comprises:
      renaming the original to an other table name;
      assigning the original table name to the union all view; and
      applying a check constraint to the distribution key column and the overflow indicator column in the original table and in the overflow table.

8. The computer system of claim 7, wherein an overflow indicator column is added to the original table and to the overflow table for diverting new data rows to the overflow table for the at least one distribution key value based on the identified distribution key skew.

9. The computer system of claim 7, wherein the parameter for identifying the threshold value is at least one of:
   a configuration parameter input to a database management system at database start up time;
   a configuration parameter dynamically input to the database management system during database operation;
   an option to a Structured Query Language (SQL) statement to create a table; and
   an option to a SQL statement to alter a table.

10. The computer system of claim 7, wherein the alternate distribution key for the overflow table is input as an option on an SQL statement.

11. The computer system of claim 7, wherein the database management system sends an alert to an end-user based on the threshold value being exceeded.

12. The computer system of claim 7, wherein the database management system automatically selects an alternate distribution key for the overflow table, based on the gathered optimizer statistics.

* * * * *